SLOAT & SPRINGSTEEN.
Screw Threading Machine.
No. 154.  Patented March 30, 1837.
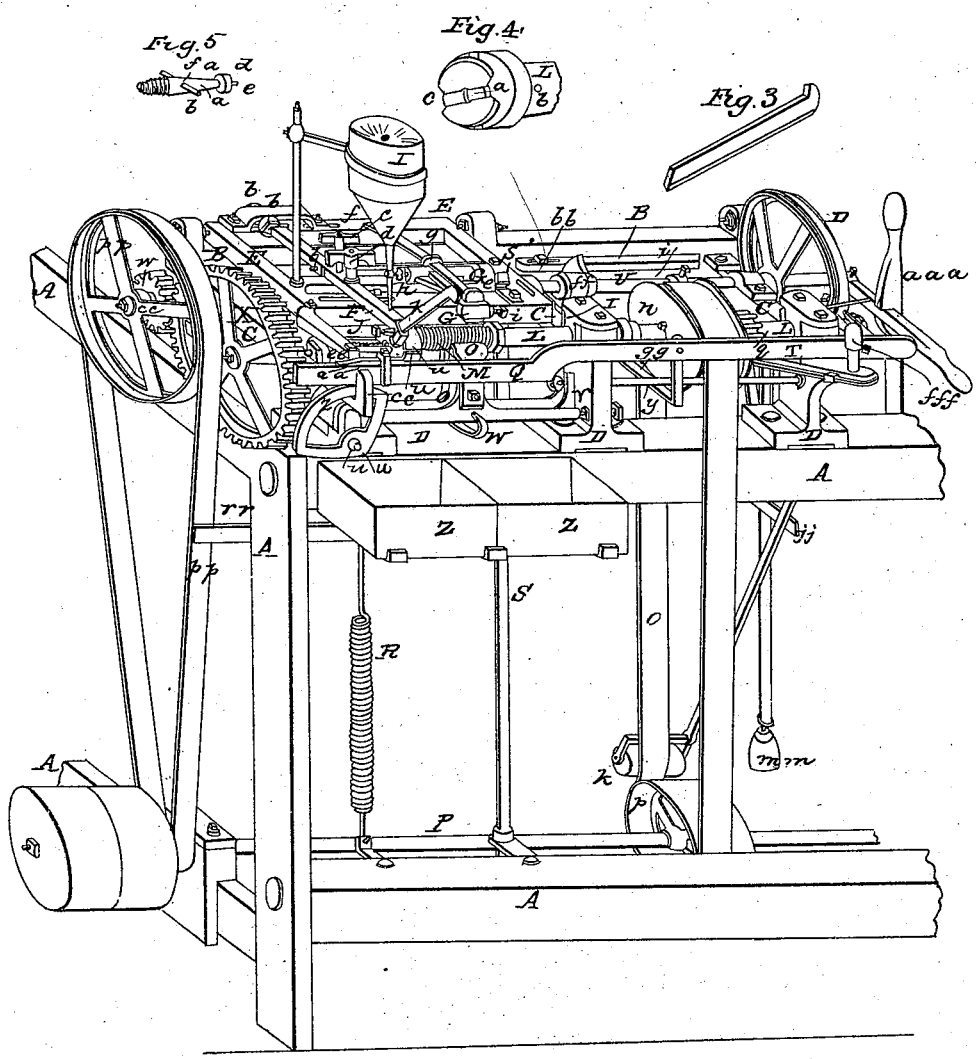

SLOAT & SPRINGSTEEN.
Screw Threading Machine.
No. 154.
2 Sheets—Sheet 2.
Patented March 30, 1837.
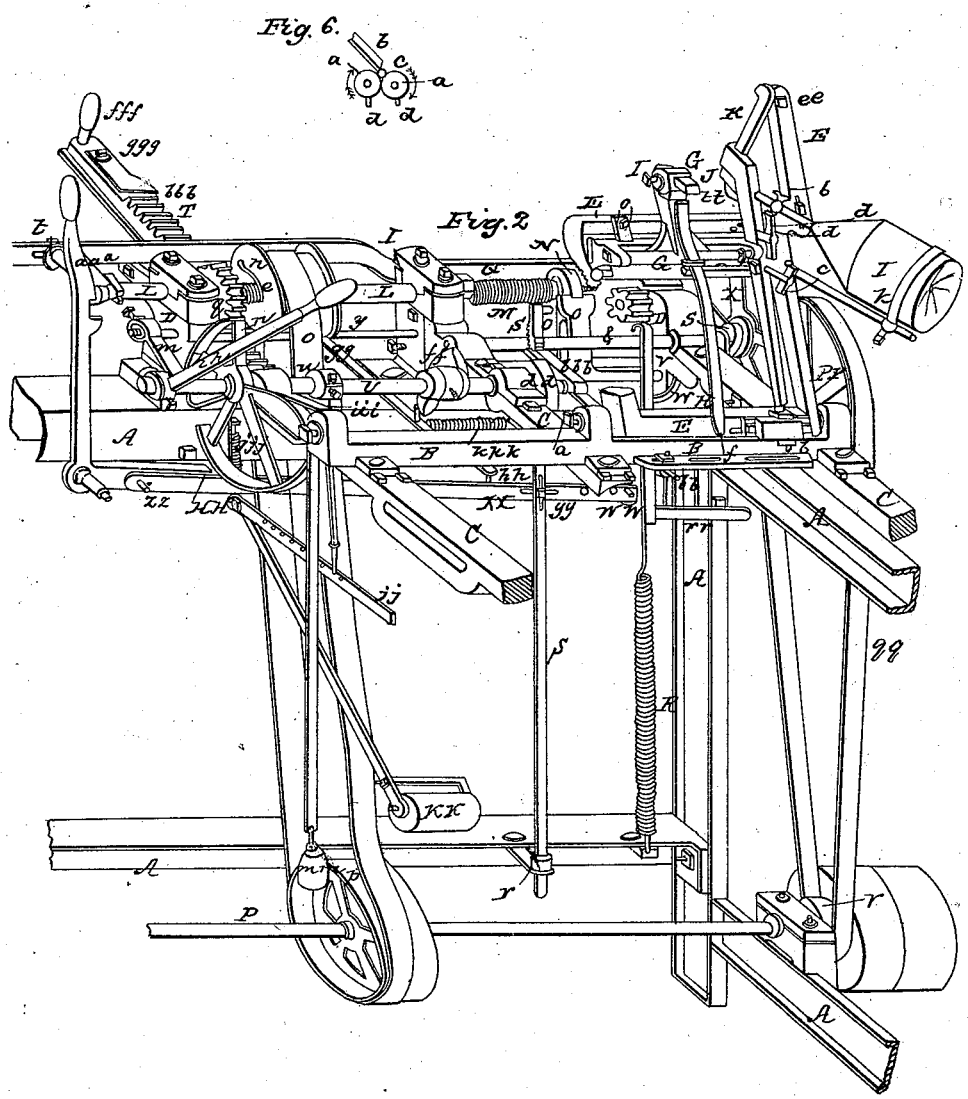

UNITED STATES PATENT OFFICE.

JACOB SLOAT, OF RAMAPO, AND THOMAS SPRINGSTEEN, OF POUGHKEEPSIE, NEW YORK.

IMPROVEMENT IN MACHINES FOR CUTTING THE THREADS OF WOOD-SCREWS.

Specification forming part of Letters Patent No. 154, dated March 30, 1837.

*To all whom it may concern:*

Be it known that we, JACOB SLOAT, of Ramapo, in the county of Rockland and State of New York, and THOMAS SPRINGSTEEN, of Poughkeepsie, in the county of Dutchess and State of New York, have invented a new and useful Improvement in Machines for Threading Screws commonly called "Wood-Screws;" and we do hereby declare that the following is a full and exact description of the construction and operation of the said machine as invented by us, reference being had to the drawings annexed.

In Figures 1 and 2, A A A A A are parts of the frame, which we make of cast-iron, ten feet long, two and one-half feet wide, and two and three-quarters feet high, which is a frame sufficient to place thereon six machines, three upon each side.

In Fig. 1 and 2, B B are pivot-bars attached to cross-bars C C C, and is placed on the center of the frame lengthwise.

In Figs. 1 and 2, C C C are cross-bars secured to the stands D D D, and are parts of the frame-work or superstructure of the machine as well as the pivot-bar B B.

In Figs. 1 and 2, E E E are cutting-frames attached to pivot-bar B B by pivots at *a a*.

In Figs. 1 and 2, F are tool-holders attached to the cutting-frame by the adjusting screw-nuts *b b b*, screw-pin *c*, and thumb-nut *d*.

In Figs. 1 and 2, G G are tooth-holders attached to the cutting-frame by pivots at *e e*.

In Figs. 1 and 2, H H represent a spring attached to the cutting-frame by a pin *f* and stirrup *g*, which stirrup is attached to a projection on the cross-bar of cutting-frame by adjusting screw-nuts.

In Figs. 1 and 2, I is a water-can having a stop-cock at *h* and a conductor which passes through tool-holder, in order to discharge water or other preparation upon the tool during the cutting process, and is supported by arm A and pillar *k*, attached to the cutting-frame.

In Figs. 1 and 2, J is a tooth for traversing the spindle, secured by the temper-screw *i*.

In Figs. 1 and 2, K is a cutting-tool secured by the temper-screw *j*, Fig. 1, which tool is adjusted in its place by passing into the socket of the tool-holder until it comes in contact with a projecting or stop piece *t t*, Fig. 2, (affixed upon the under side of the tool-holder covering a portion of the socket,) and the face of the wide part of the end bevel of the cutting-tool. For the form and shape of said cutting-tool see Fig. 3. It is prepared by applying the end bevel to the grindstone uniformly alike.

In Figs. 1 and 2, L L are spindles moving in boxes or stands D D at *l l*, having a pulley *n*, four and one-half inches in diameter, driven by the belt *o* and connected with the pulley *p*, ten inches in diameter, on the driving-shaft P; also, on spindle is a spur-gear *q*, about two and one-half inches diameter, which works into rack T; also, on spindle an adjusting-collar *s*; also, attached to spindle is slide-bar Q by arms *t t*.

In Figs. 1 and 2, M is a leader, being an index-screw for traversing the spindle in cutting the screws. The same is secured onto the spindle.

In Figs. 1 and 2, N is a chuck attached to a flexible joint-piece on the leader end of the spindle by a coarse screw to said joint-piece. (See sectional drawings, Figs. 4 and 5.) L, Fig. 4, is part of the spindle, *u*, Fig. 4, is a notch, in which the holdfast O O, Figs. 1 and 2, works. *a*, Fig. 4, is a joint-piece passing into the spindle and secured by the pin *b*, Figs. 4 and 5. On the front side of chuck at *c*, Fig. 4, is a slot or opening to admit the screw-head, at the center of which inside is a countersink corresponding with the shape of the screw-head, standing in direct contact with the end of said joint-piece, which end of joint-piece passes entirely through the bed of said slot and fastens the screw in the chuck when screwed up in the operation of the machine. *d*, Fig. 5, is a piece of india-rubber or any other elastic and hard substance fitting the cavity in spindle and placed on the small spindle *e*, Fig. 5, the object of which is to allow the joint-piece to rock and adjust itself if the head of the screw is not square with the body of it, the hole *f*, Fig. 5, being made larger on the outside, but of the size of the pin in the middle.

In Figs. 1 and 2, O O are holdfasts placed on pivots *v v*, held together by spring *w*, Fig. 1, and opened by cam *x*, Fig. 1, on shaft *y*, passing through stands D D, on the contra end of which shaft is an arm *m*, Fig. 2, against which the eccentric *l l* works when the handle $n\,n$ is moved up or down in opening or closing the jaws of holdfast.

In Figs. 1 and 2, P is a driving-shaft with driving-pulleys attached.

In Figs. 1 and 2, Q is a slide-bar resting on friction-roller $z$, Fig. 1, and kept in place by stand $c\,c$, Fig. 1, which roller is placed on the arm $t\,t$, Fig. 1, (denominated the "graduator,") on stud $u\,u$, Fig. 1, which is affixed to a shaft extending to the back side of stand D and passing through it, upon the contra end of which is affixed the arm $v\,v$, Fig. 2, which arm is connected by the connecting-rod $w\,w$, Fig. 2, (having a regulating-pin,) with lever $x\,x$, Fig. 2, which lever $x\,x$ is connected with ratchet-bar S S at fastening-screw $y\,y$, Fig. 2, and with catch-bar $a\,a\,a$ at $z\,z$, Fig. 2, on which slide-bar is also affixed gage $a\,a$, Fig. 1, which gage is secured by yoke $b\,b$, Fig. 1, and indicates the form of the cut of screw. The follower $e\,e$ works on said gage.

In Figs. 1 and 2, R is a spiral spring fastened to the lower girt of frame and the cutting-frame, it being of sufficient power to apply the tool in cutting the screw, and is connected with lever $r\,r$, which lever is to disengage at pleasure the spring from cutting-frame.

In Figs. 1 and 2, S S represent a ratchet-bar having ratchets on both sides of the upper end of it and having a slide collar or pin at the lower end at $r$.

In Figs. 1 and 2, T is a rack-gear working in pinion $q$, attached to stand D and bar C.

In Figs. 1 and 2, U is a shaft supported on cross-bar C C, upon which is affixed spiral or transverse cam $f\,f$, which moves the lever $g\,g$, which lever is attached to slide-bar Q and stud $h\,h$, which stud is affixed to pivot-bar B; also, a winding-block $i\,i$, which is connected by strap to lever or arm $j\,j$, which arm is attached and moves the belt-tightener K K; also, eccentric and cam $l\,l$, to which eccentric is attached strap and weight $m\,m$; also, handle on lever $n\,n$; also, an eccentric-cam $d\,d\,d$, Fig. 2, placed on the contra end of shaft under the cutting-frame to throw up the cutting-frame on the completion of a screw; also, a spring latch or catch $b\,b\,b$ and $b\,b\,b$, Fig. 2, is moved back by a pin deviating from the center of shaft three-eighths of an inch in the end of said shaft and working in a slot of said catch, which catch works into the back side of ratchet-bar and embracing it by a loose band having a space of one-half an inch between said bands and the front side of ratchet-bar when the catch is in a notch. $o\,o$, Fig. 1, is a catch working into the front of ratchet-bar.

In Figs. 1 and 2, V is a pulley on driving-shaft about three inches in diameter, and drives pulley $p\,p$, about ten inches in diameter, by belt $q\,q$.

In Fig. 1, W is a changing pinion on movable stud $c\,c\,c$, affixed on cross-bar C, which pinion is substituted by a change of pinions corresponding to the length of screw and number of turns of the thread to be cut.

In Figs. 1 and 2, X is a cog-wheel about nine inches in diameter, working into pinion W, upon the shaft of which is an eccentric-cam $s\,s$, Fig. 2, that raises the cutting-frame each turn of said shaft.

In Fig. 1, Y is a chip-box, which also catches the drippings of the water to be reused.

In Fig. 1, Z is a screw-box having a conductor leading from under the chuck.

In Fig. 2, & is a shaft turned by cog-wheel X, and moves the lifting-cam S S. $e\,e\,e$, Fig. 2, is a spring-catch on spindle L. Its use is to stop the spindle in a desired position on the completion of the screw, the arm of which spring is caught (when the spindle is drawn back) between the projecting piece $g\,g\,g$, Fig. 2, and pin $h\,h\,h$, Fig. 2, and stops the revolution of the spindle, with the slot $c$, Fig. 4, in a vertical position, for the purpose of convenience in disengaging the screw from the chuck when done and in putting the next screw in to be made. $i\,i\,i$, Fig. 2, is an arm on eccentric $l\,l$ to stop the shaft U and its appendages from turning too far, by which the parts connected with it are adjusted for operation. $j\,j\,j$, Fig. 2, is a spiral spring to hold up the catch-bar $a\,a\,a$. $k\,k\,k$, Fig. 2, is a spiral spring attached to lever $g\,g$ and a fixture bolted to cross-bar C and serves to throw forward the spindle (by its connection with the slide Q) when the tooth is disengaged from the leader M. $l\,l\,l$, Fig. 2, is a dead-rest or die, with eight recesses, (and may be more or less,) upon which the screw is rested while cutting. $f\,f\,f$, Figs. 1 and 2, handle of rack.

In Fig. 6 is a sectional drawing showing the revolving die used in the place of the dead-rest shown in the principal drawing. $a\,a$ are revolving dies of hardened steel about one and one-half inches diameter and of any suitable length corresponding with the length of screw to be cut. $b$ is the point of the cutting-tool; $c$, a section of the screw; $d$, a wiper to disengage the chips. The arrows point the direction of the rollers. They are affixed on pivots to a regulating-piece attached to stands D in a manner to rise up or down to correspond with the size of the wire and to compensate for the wear of the rollers.

All of the above-described parts are susceptible and may be varied in size and be made of different kinds of materials suggested by appropriate mechanical skill and workmanship.

*Use and operation.*—Place a screw-blank into the countersink in slot $c$, Fig. 4, with the left hand; hold with the right hand on handle $f\,f\,f$; shove in the rack T, by which the spindle is turned, the joint-piece $a$, Fig. 5, and is screwed into chuck, the same being held by the holdfast O O till said joint-piece comes in contact with the head of the screw-blank and firmly secures it in the chuck. The handle $n\,n$ is then brought down and caught by catch-bar $a\,a\,a$, which, by the action of the cam $d\,d\,d$, Fig. 2, lets down the cutting-frame, bringing the tooth into the leader and tool upon the screw-blank, and at the same time drops the belt-tightener $k\,k$ upon the belt and starts the spindle, and at the same time disengages the transverse cam $f\,f$, Fig. 2, from the bar $g\,g$ and allows the spring $k\,k\,k$ to throw forward the spindle, and at the same time by the action of the eccentric-cam $l\,l$, Figs. 1 and 2, upon arm $m$, Fig. 2, on shaft $y$, upon which the cam $x$, Fig. 1, is placed, the holdfasts are released from the notches and the spindle allowed to turn, and at the same time the follower $e\,e$ is brought upon the highest part of the gage $a\,a$, Fig. 1, and held firmly to it by spring R, and at the same time the spring-catch $b\,b\,b$ and $b\,b\,b$, Fig. 2, is allowed to move up into the ratchet-bar by the pin deviating from the center of shaft U, being brought forward and allowing the spring to throw forward the catch and enter a notch and retain the ratchet-bar till the cutting-frame again falls for another cut, when the catch $o\,o$, Fig. 1, takes another notch in the ratchet, whereupon the spindle traverses back by the action of the tooth upon leader, and the first cut is commenced, at which the slide commences to draw back, and with it the gage from under the follower and the tool let down upon the blank corresponding with the shape of the gage, be it more or less tapering, so that the screw may be made a gradual taper or all the way of a size, or give it an acute taper at the point, making what we call "gimlet-points," or any other shape desired. When the cut is finished, the cam $s\,s$ lifts the cutting-frame and disengages the tooth from leader, when the spindle is again thrown forward, when the cam $s\,s$, having turned from under the cutting-frame, allows it to fall, bringing the tooth into leader again and the tool upon the blank, when another cut is made, and so on, a repetition of cuts—say, eight—always, however, regulated by the proportion of the pinion W to the wheel X, graduating each cut by the action of the ratchet-bar and graduator $t\,t$, Fig. 1—to wit, at each successive cut. As the cutting-frame rises up it brings with it the ratchet-bar by the catch $o\,o$, Figs. 1 and 2, raising the ratchet-bar one notch, which the spring latch or catch $b\,b\,b$ and $b\,b\,b$, Fig. 2, catches on the contra side, and by it turns the graduator by the arm $v\,v$, Fig. 2, toward its vertical position, and also by bringing the lever $x\,x$ against the projecting piece $l\,l\,l\,l$, Fig. 2, on the arm of $a\,a\,a$, and draws the same off from the handle $n\,n$ by a succession of lifts and allows the handle to rise by the weight $m\,m$, which disengages the ratchet entirely, and it drops down upon slide-band $r$, when also the transverse cam drives back the lever $g\,g$ and holds back the spindle, when the rack is drawn back and disengages the finished screw.

The operation of the graduator is as follows: At the commencement of the cutting of the screw the graduator is thrown out of the vertical position in an angle of forty-five degrees or thereabout, when, as the ratchet-bar lifts up, it turns the graduator toward the vertical and dead-point of the circle, and consequently drops the cutting-frame less and less till it gets on the dead-point, when the tool is applied so lightly that it simply burnishes the screws.

The individual parts of which we claim as new, and desire to secure by patent, are as follows, viz:

1. The gage and slide bar and the manner of applying it to the cutting process, by which a uniform shape is given to the screw.

2. The revolving die.

3. The cutting-frame and appendages, excepting the tooth and spring H H, which are not new, but applied in a different way.

4. The slot in the chuck.

5. The elastic substance in the joint-piece.

6. The holdfast with the manner of opening the same.

7. The general combination of the parts of the machine, many of which are not new, but arranged different from any other device of which we have any knowledge.

JACOB SLOAT.
THOMAS SPRINGSTEEN.

Witnesses to Thomas Springsteen:
  FREDERICK GOODELL,
  EZEKIEL BROWN.
Witnesses to Jacob Sloat:
  E. BROWN,
  EDWARD SUFFERN.